(12) United States Patent
Vandenbergh et al.

(10) Patent No.: US 7,876,238 B2
(45) Date of Patent: Jan. 25, 2011

(54) METHODS AND SYSTEMS FOR DISPLAYING PROCEDURE INFORMATION

(75) Inventors: Thatcher L. Vandenbergh, Centennial, CO (US); David Duncan Howland, Littleton, CO (US); John Maris, Saint-Bruno (CA); Jens Schiefele, Wiesbaden (DE)

(73) Assignee: The Boeing Company, Chicago, IL (US)

( * ) Notice: Subject to any disclaimer, the term of this patent is extended or adjusted under 35 U.S.C. 154(b) by 538 days.

(21) Appl. No.: 11/566,927

(22) Filed: Dec. 5, 2006

(65) Prior Publication Data
US 2007/0168120 A1    Jul. 19, 2007

Related U.S. Application Data

(60) Provisional application No. 60/753,265, filed on Dec. 22, 2005.

(51) Int. Cl.
*G01C 21/00* (2006.01)

(52) U.S. Cl. .................. 340/971; 340/988; 340/945; 701/14; 701/15; 701/16

(58) Field of Classification Search .............. 340/988, 340/945, 973–983; 701/14–18
See application file for complete search history.

(56) References Cited

U.S. PATENT DOCUMENTS

| | | | |
|---|---|---|---|
| 5,758,297 A | 5/1998 | Gaultier | |
| 5,844,503 A | 12/1998 | Riley | |
| 5,978,715 A | 11/1999 | Briffe et al. | |
| 6,112,141 A * | 8/2000 | Briffe et al. | 701/14 |
| 6,542,796 B1 * | 4/2003 | Gibbs et al. | 701/3 |
| 6,633,810 B1 | 10/2003 | Qureshi et al. | |
| 6,661,353 B1 * | 12/2003 | Gopen | 340/973 |
| 6,799,095 B1 | 9/2004 | Owen et al. | |
| 6,922,631 B1 * | 7/2005 | Dwyer et al. | 701/206 |
| 7,420,476 B2 * | 9/2008 | Stiffler | 340/945 |
| 2003/0193411 A1 * | 10/2003 | Price | 340/973 |
| 2005/0007261 A1 * | 1/2005 | Berson et al. | 340/945 |
| 2006/0022845 A1 | 2/2006 | Fischer | |
| 2006/0142904 A1 | 6/2006 | Caillaud et al. | |

OTHER PUBLICATIONS

International Search Report of PCT/US2006/047319; May 27, 2008; 20 pages.

U.S. Department of Transportation Advisory Circular; Guidelines for the Certification, Airworthiness, and Operational Approval of Electronic Flight Bag Computing Devices; AC No. 120-76A; Mar. 17, 2003; 32 pages.

U.S. Department of Transportation Companion to Advisory Circular—Guidelines for the Certification, Airworthiness, and Operational Approval of Electronic Flight Bag Computing Devices; Companion to AC No. 120-76A; Electronic Flight Bag (EFB Job Aid) Jan. 26, 2006; pages.

Federal Aviation Administration Advisory Circular; Use of Class 1 or Class 2 Electronic Flight Bag (EFB); AC No. 91-78; Jul. 20, 2007; 5 pages.

* cited by examiner

*Primary Examiner*—George A Bugg
*Assistant Examiner*—Kerri McNally
(74) *Attorney, Agent, or Firm*—Armstrong Teasdale LLP

(57) ABSTRACT

A navigation procedure display is described. The navigational procedure display includes a dynamic information area, positioned within the flight procedure display, for displaying a current procedure instruction and at least one successive procedure instruction. The navigational procedure display also includes a moving map area, positioned within the procedure display, for displaying a current position indication in at least three dimensions and situational awareness symbols.

29 Claims, 7 Drawing Sheets

METHODS AND SYSTEMS FOR DISPLAYING PROCEDURE INFORMATION

CROSS REFERENCE TO RELATED APPLICATIONS

This application claims the priority of U.S. Provisional Patent Application Ser. No. 60/753,265 filed Dec. 22, 2005, and entitled "Data Driven Approach Function Display Functions," which is hereby incorporated by reference in its entirety.

BACKGROUND OF THE INVENTION

This invention relates generally to procedural navigation displays and more particularly, to methods and systems for supplying dynamically depicted procedure information to navigation information displays.

With regard to providing flight navigation information, a traditional paper-based flight bag may include, in paper form, such aids as enroute charts, departure procedures, engine out procedures, standard instrument departure procedures (SIDS), standard terminal arrival routes (STARS), approach plates, taxi diagrams, extended twin engine operations (ETOPS) and oceanic navigational logs, and planning charts. The flight bag also generally includes operations manuals, flight manuals, MEL/CDL, fault reporting manuals, performance data, checklists, and operations specifications. Electronic Flight Bags (EFBs) are known. With such EFBs, however, paper charts cannot be replicated on electronic displays without heavy panning and scaling. Also, symbols may overlap each other if they are too close together on a screen and text leader-arrows may collide during rotation of the screen.

The initial focus of EFB applications was to facilitate adoption of electronic formats over paper charts by minimizing the differences between paper and electronic formats. Changes and capabilities between paper and electronic formats are minimized to facilitate industry adoption and certification with a minimum amount of training.

This invention goes beyond the initial type of EFB applications in that it provides extended capabilities beyond what typical "fixed format" applications can provide.

While electronic display of two dimensional maps has been common for web-based applications or car navigation systems, the types of data and innovations for aviation are very different in function and format due to several factors. Aviation and underwater applications require more than two-dimensional navigation concepts. Procedures for aviation and underwater applications may be described using four-dimensional concepts where descriptions of timing, such as time of arrival, are included with descriptions of position, such as latitude, longitude, and altitude (depth). Terrain variations and obstacles, such as radio towers, are important factors to safe navigation and not merely points of interest or landmarks. Likewise, Navigation Aids (NavAids) exist at fixed points in space without reference to any physical location or geographical feature. Use and depiction of prescribed procedures as well as their naming is critical to communication between the pilot, air traffic controller, flight dispatcher and other aircraft in the area.

BRIEF DESCRIPTION OF THE INVENTION

In one embodiment, a navigation procedure display is provided. The navigational procedure display includes a dynamic information area, positioned within the flight procedure display, for displaying a current procedure instruction and at least one successive procedure instruction. The navigational procedure display also includes a moving map area, positioned within the procedure display, for displaying a current position indication in at least three dimensions and situational awareness symbols.

In another embodiment, a navigation procedure display system is provided. The display system includes an electronic display screen configured to display at least one of a moving map and a selection of procedural information. The at least one of a moving map and a selection of procedural information includes navigational information in at least three dimensions. The display system further includes at least one input device in communication with the electronic display screen, the at least one input device configured to enable modification of the content displayed on the electronic display screen.

In yet another embodiment, a method of displaying navigation information on an electronic display is provided. The method includes selecting a navigation procedure and displaying a movable map and a dynamic information area including at least one of a current procedure instruction and a subsequent procedure instruction.

DETAILED DESCRIPTION OF THE INVENTION

This invention relates generally to procedural navigation displays and more particularly, to methods and systems for supplying dynamically depicted procedure information to navigation information displays. One exemplary embodiment that will be used as a familiar, but non-exclusive example, relates to flight deck display systems used in aircraft. The text will often describe fight deck display systems, however, the system is equally applicable to maritime and submariner applications as well as extra-terrestrial navigation.

This invention may be implemented in various physical configurations based on the target platform and aircraft. The data-driven aspect of the system utilizes data elements that are grouped as procedures but accessed from individual, separate entities stored in a data-store or database. Initial EFB applications, which are primarily focused on the transition from paper to electronic displays, store procedures or charts as unique pre-composed files where particular elements exist in multiple files. In contrast to those initial EFB applications, an electronic display that includes data-driven capabilities as described herein, organizes elements based on chart or procedure definitions, but realizes and renders the display image by accessing the elements individually and applying rules or heuristics to provide the desired depiction.

Figure 1:
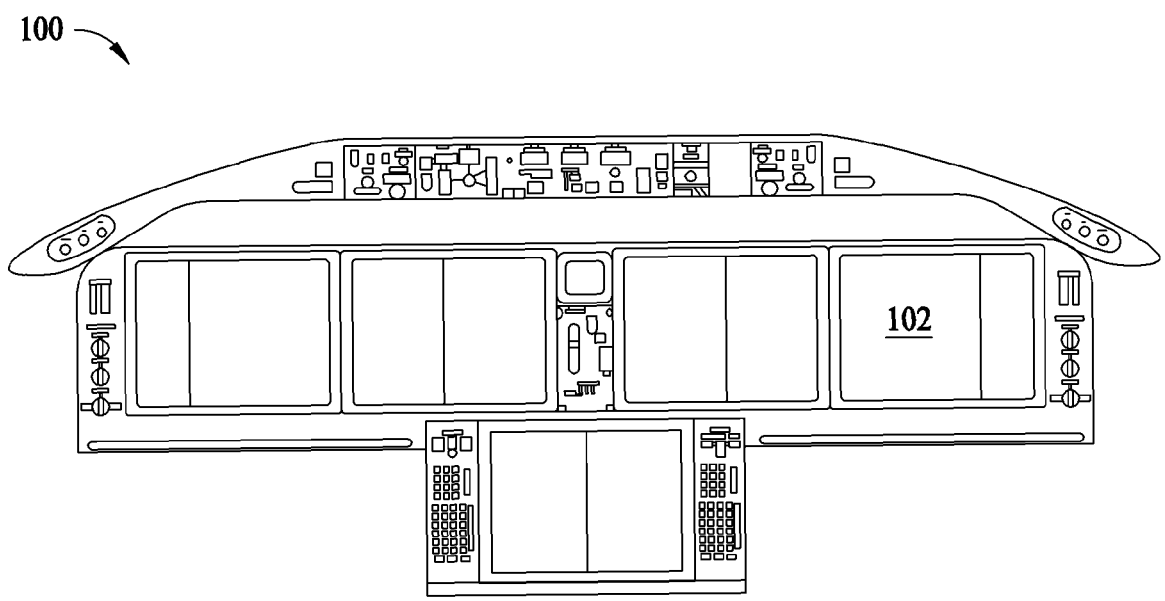
FIG. 1 is a forward perspective view of an exemplary aircraft cockpit display panel that includes at least one display screen in accordance with an embodiment of the present invention.

FIG. 1 is a forward perspective view of an exemplary aircraft cockpit display panel 100 that includes at least one display screen 102 in accordance with an embodiment of the present invention. In the exemplary embodiment, display screen 102 is positioned on aircraft cockpit display panel 100. In an alternative embodiment, display screen 102 is positioned on an auxiliary panel (not shown) located in the cockpit or positioned elsewhere within the aircraft. In another alternative embodiment, display screen 102 is part of a mobile device that may be viewed anywhere. During aircraft operation, display screen 102 is available for viewing by a pilot and/or co-pilot of the aircraft.

Figure 2:
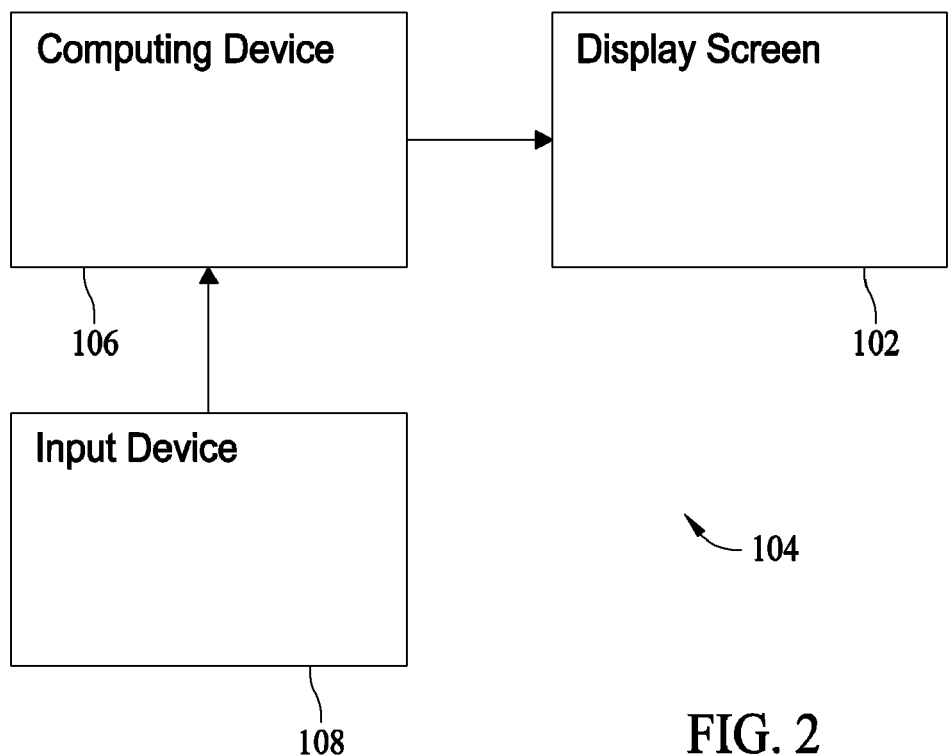
FIG. 2 is a block diagram of an embodiment of a navigation procedure display system.

FIG. 2 is a block diagram of an exemplary embodiment of a display system 104 that dynamically depicts navigation procedures, such as flight procedures. Display system 104 includes display screen 102, a computing device or system 106, and at least one input device 108. Computing device or system 106 may include, but is not limited to, a fixed or removable electronic flight bag, or a fixed or removable avionics device. Input device 108 is in direct communication with computing device 106, which is in communication with display screen 102. Input device 108 may be at least one of a touch screen, a rotary dial, and a switch.

Figure 3:
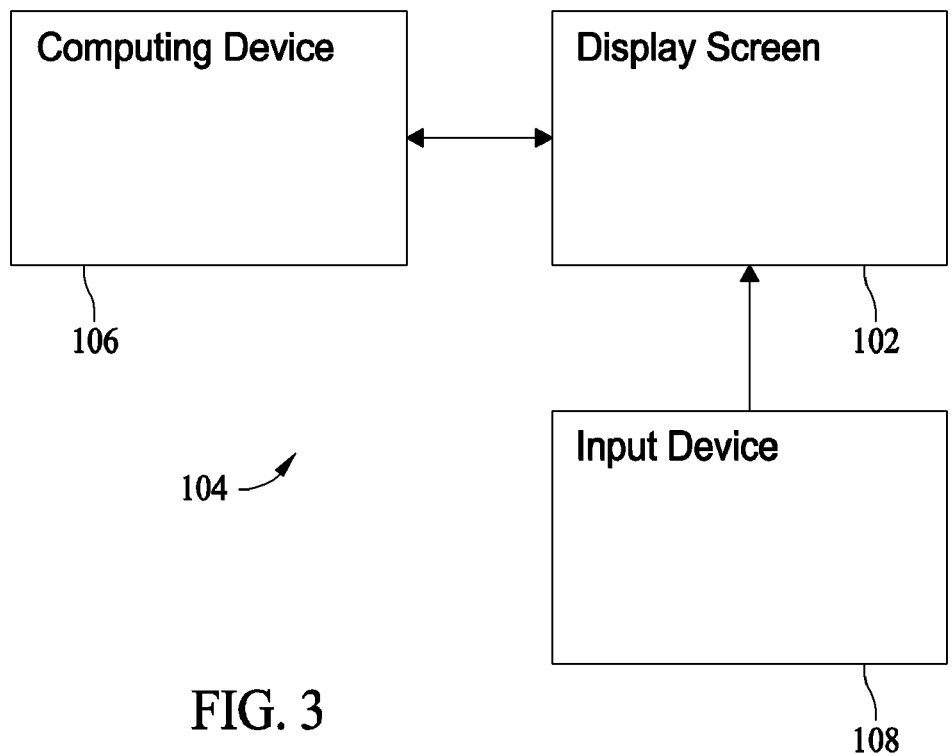
FIG. 3 is a block diagram of another embodiment of a navigation procedure display system.

FIG. 3 is a block diagram of another exemplary embodiment of display system 104. In this embodiment, input device 108 is in direct communication with display screen 102, which is in communication with computing device 106.

Referring now to display system 104 of FIGS. 2 and 3, display screen 102 may be used to view data included in computing device 106. Computing device 106, in one embodiment, is a standalone device such as, but not limited to a personal digital assistant (PDA) or laptop personal computer (PC), or as a software component of a system executing on a processor that is part of a subsystem of the aircraft. In the exemplary embodiment, computing device 106 includes an electronic storage device configured to store various user-configurable flight-related objects for all required and desired information for a particular flight, such as flight routes, as defined by way-points, airport information, temporary flight restrictions, and weather information as well as any other user-defined objects associated with a flight, ground operations, and/or flight planning. Computing device 106 receives data from various aircraft and ground sensors and systems, determines flight information based on the received data in real-time, and displays the flight information and/or alerts the flight crew through display screen 102 and other aural and/or visual indicators positioned on cockpit display panel 100. Such flight information provides the flight crew with additional situational awareness during all phases of aircraft operation.

Figure 4:
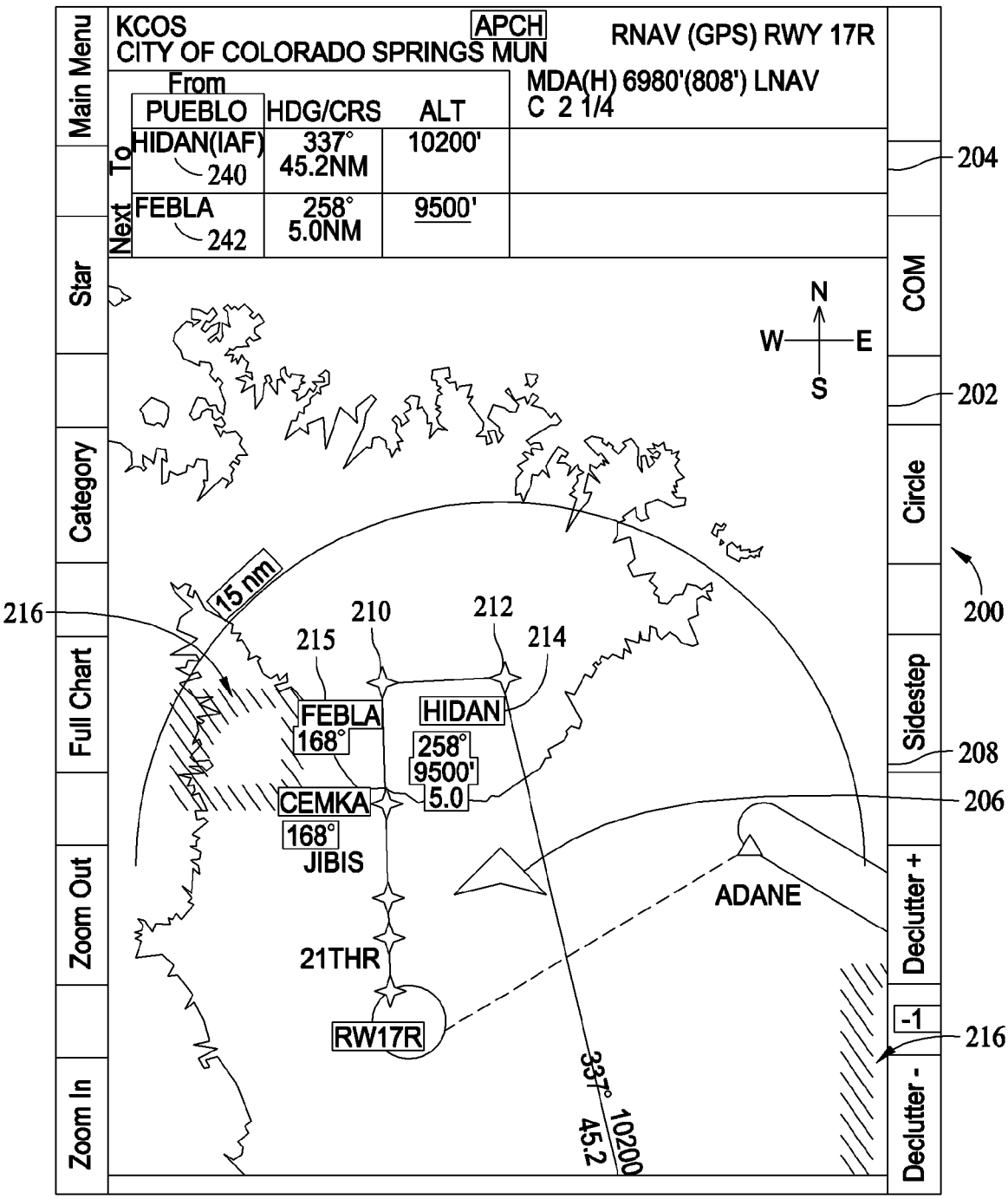
FIG. 4 is a screen shot depicting an exemplary view of a procedure display.

FIG. 4 is a screen shot depicting an exemplary view of a flight procedure display 200 output by procedure display system 104 on display screen 102. Procedure display 200 includes a moving map display area 202 and a dynamic information area 204. Dynamic information area 204, in an exemplary embodiment may be described as a dynamic BRIEFING STRIP® information area. Dynamic BRIEFING STRIP® information area 204 is positioned within the procedure display 200, for displaying a current procedure instruction and at least one successive procedure instruction. BRIEFING STRIP® is a registered trademark of Jeppesen Sanderson, Inc. of East Englewood, Colo. BRIEFING STRIP® information areas are currently included in many paper charts. What is referred to herein as a dynamic BRIEFING STRIP® information area 204 is an application of the current invention that dynamically changes the contents of an electronically displayed version of a BRIEFING STRIP® information area.

In one embodiment, map display area 202 depicts a plan view of an entire navigation procedure on display screen 102. Moving map display area 202 includes a current aircraft position indicator 206 that is maintained proximate a center of map display area 202 or within a margin 208 of map display area 202. In an exemplary embodiment, map display area 202 changes in response to a user input, for example, a user input selecting a particular procedure to view.

In another exemplary embodiment, map display area 202 moves in response to an automatic input from, for example, an altimeter, an air speed indicator, and a positioning system such as a global positioning system (GPS), which maintain a current aircraft position with respect to the map and selected flight procedure. In the exemplary embodiment, margin 208 is displayed for user convenience and is selectable to a non-displayed mode to reduce clutter on procedure display 200. A width of margin 208 may be adjusted by a user. Margin 208 is selectably adjustable to permit keeping current aircraft position indicator 206 closer to the center of map display area 202 or to permit current aircraft position indicator 206 to traverse over a greater area of the display screen. The current aircraft position indicator 206 may be displayed on a track-up oriented moving map (as depicted in FIG. 4), a north-up oriented moving map display (not shown), or any other desired map orientation.

Moving map display area 202 also includes at least one symbol. In the example of FIG. 4, map display area 202 includes situational awareness symbols 210 and 212. In the exemplary embodiment, symbols 210 and 212 each signify a location where a new leg of the selected procedure begins. In another embodiment, symbols 210 and 212 may signify a change in procedure or altitude as predetermined to be of interest to a user. Symbols 210 and 212 are abstract symbols and may have an associated alphanumeric label, for example, alphanumeric labels 214 and 215. In an exemplary embodiment, alphanumeric labels 214 and 215 include a symbol name.

By minimizing the amount of information attached to each symbol within map display area 202, and by closely positioning the information associated with each symbol, an amount of "white space" within map display area 202 may be maximized. White space is the space on a map that is not occupied by description. Increasing the amount of white space on map display area 202 provides for increased readability and a greater amount of space remains within map display area 202 for displaying the selected procedure. A greater amount of white space allows for more of the selected procedure to be displayed on map display area 202, in one embodiment, an entire procedure may be displayed on map display area 202.

In another embodiment, the amount of white space within map display area 202 may not be considerable, however, minimizing the amount of information attached to each symbol within map display area 202, and closely positioning the information associated with each symbol, provides the information to a user in a clear and organized manner. Another type of exemplary symbol included on map display area 202 is a restricted area indicator 216.

Figure 5:
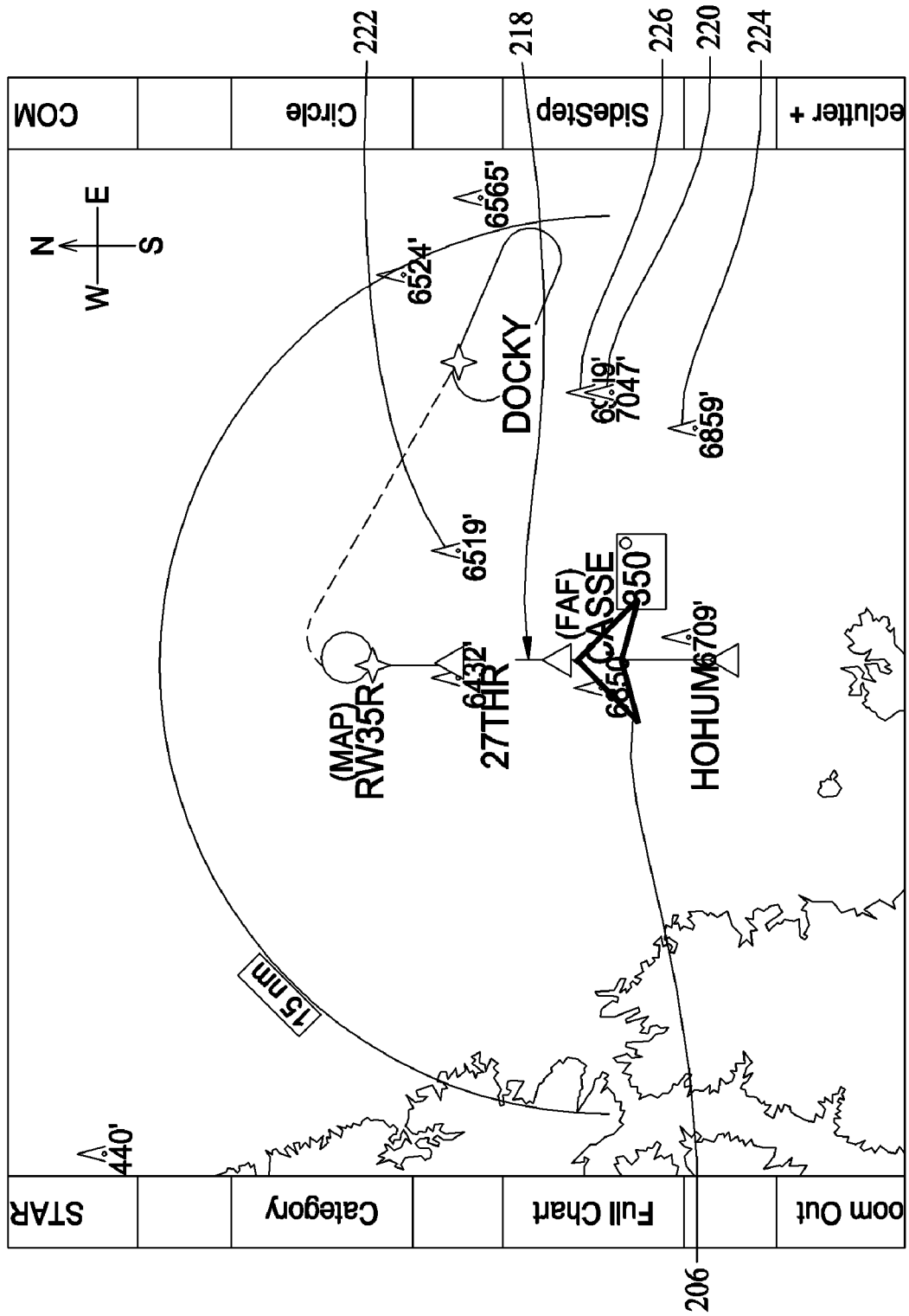
FIG. 5 is a view of a portion of the procedure display of FIG. 4.

FIG. 5 is a view of a portion of procedure display 200 of FIG. 4. More specifically, FIG. 5 is a view only of an exemplary screen shot of moving map display area 202, with other portions of procedure display 200 removed for clarity. The example embodiment of FIG. 5 includes current aircraft position indicator 206 and a plurality of situational awareness symbols including procedure leg symbols, for example, procedure leg symbol 218, and obstacle indicator symbols 220, 222, 224, and 226.

As shown in FIG. 5, a symbol may conflict with another symbol within map display area 202. For example, symbols representing elevations close in proximity may overlap on map display area 202. Situational awareness symbols 218, 220, 222, 224, and 226 are displayed in accordance with a set of rules. Each symbol is given a predetermined level of significance based on the underlying information symbolized. The symbols are displayed in order according to the predetermined level of significance. When a symbol conflicts with another symbol, such as symbol 220 and symbol 226 in FIG. 5, the more significant symbol is displayed in a foreground of the display area 202 as compared to the less significant symbol. In other words, the more significant symbol, in this example symbol 220, is viewable on map display area 202 unobstructed by the less significant symbol, which in this example is symbol 226.

Providing predetermined levels of significance to displayed symbols ensures that the symbols representing the most significant information, and the description associated with those symbols, are available to a user of flight procedure display system 104. In an example embodiment, when the conflicting symbols are situational awareness symbols representing land elevation, the symbol representing land of a higher elevation is displayed over a symbol representing land of a lower elevation. The land at the higher elevation is more significant to an aircraft because an aircraft is in greater danger of hitting the land at the higher elevation.

Figure 6:
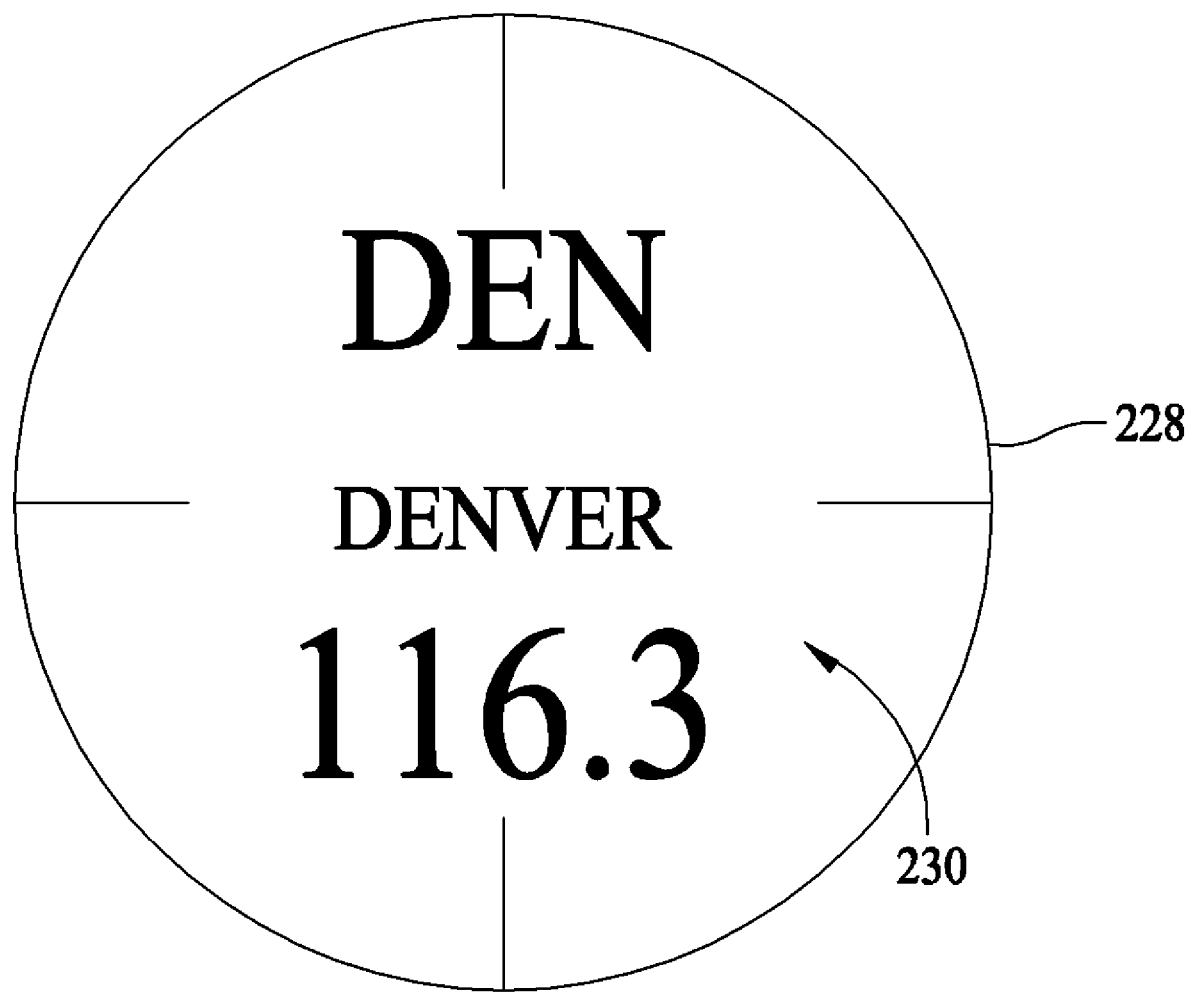
FIG. 6 is an exemplary display symbol used in conjunction with the moving map of FIG. 5.

FIG. 6 is an exemplary embodiment of a display symbol 228 that may be used on a map within moving display map area 202. More specifically, symbol 228 is a symmetrically shaped situational awareness symbol that includes embedded information 230.

As the map displayed within moving map display area 202 rotates, the positions of some symbols (e.g. obstacle and terrain symbols) remain fixed with respect to the map. However, other symbols (e.g. NavAid symbols) may not be fixed with respect to the map and may change position with respect to the map in response to a variety of inputs including, but not limited to, an altimeter, an air speed indicator, and a positioning system such as a GPS. Symbols may also rotate such that text associated with the symbol remains upright and can be read from left-to-right independent of the movement of the map. By choosing symmetrically shaped symbols, for example the symbol of FIG. 6 described above, conflicting symbols will not overlap or overwrite to a greater degree as the displayed map moves.

Symbols may be sized appropriately to stay legible without taking up too much display space, unlike the static-sized symbols typically used on paper charts. The ranking of the significance of each symbol, and a dynamic depiction aspect of the moving map, which allows a single user-selected procedure to appear on the map rather than a multitude of procedures as is currently displayed on typical paper charts, ensures that the moving map is clear and legible even though the moving map includes larger symbols than a typical paper chart.

Figure 7:
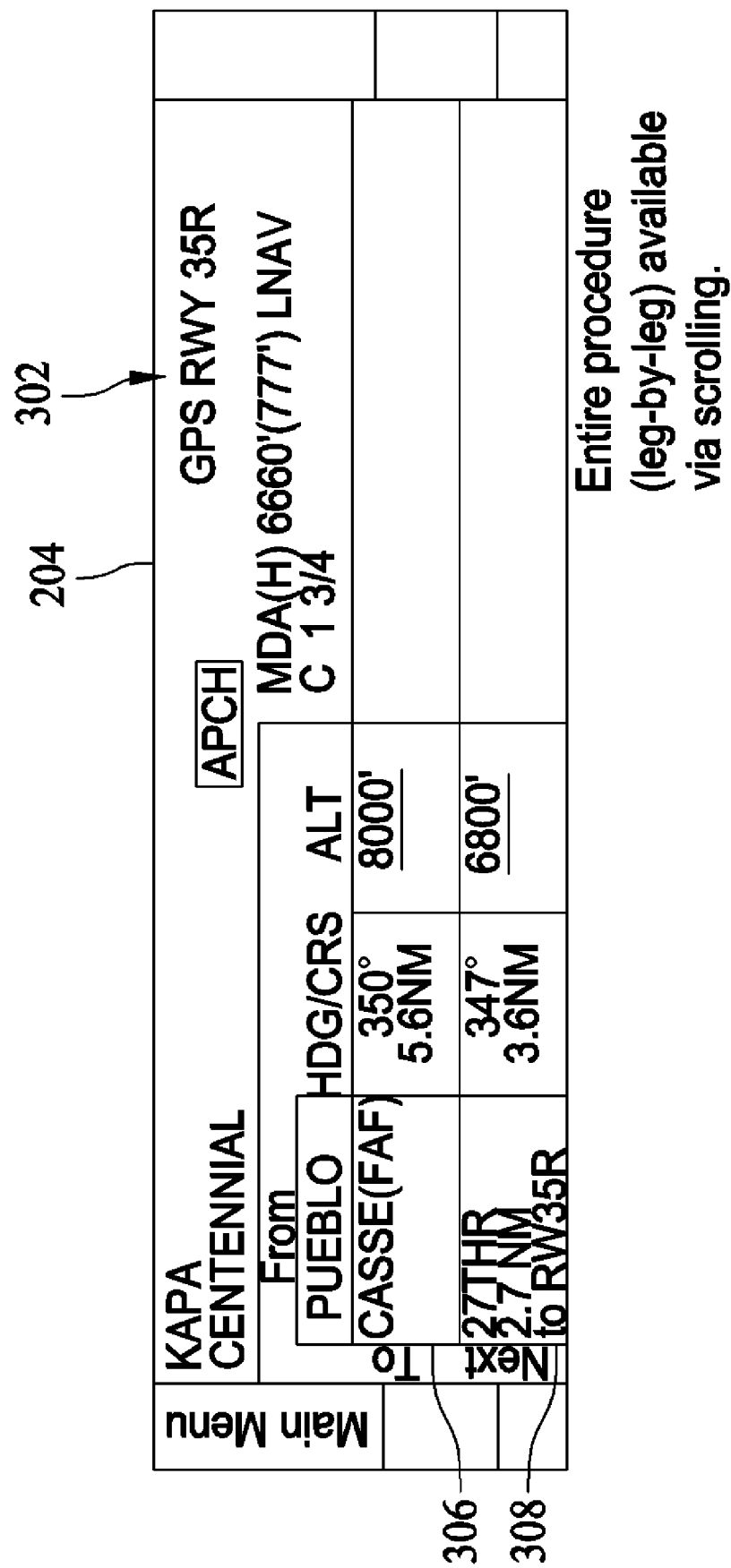
FIG. 7 is a view of another portion of the procedure display of FIG. 4.

FIG. 7 is a view of a portion of procedure display 200 of FIG. 4. More specifically, FIG. 7 is a view only of an exemplary screen shot of dynamic BRIEFING STRIP® information area 204, with the other portions of procedure display 200 removed for clarity. As described above with respect to FIG. 4, symbols 210 and 212 are symmetrical symbols with associated alphanumeric descriptions 214 and 215. Alphanumeric descriptions 214 and 215 correspond to labels 240 and 242, respectively, of dynamic BRIEFING STRIP® information area 204. As stated above, by minimizing the amount of information attached to each symbol within map display area 202, an amount of white space is increased. Increasing the amount of white space on map display area 202 increases the readability of map display area 202 and a greater amount of space remains for displaying the selected procedure. On a paper chart, a symbol typically contains added information indicating what the symbol represents. This information may be associated with the symbol by a line or an arrow extending from the symbol and leading to a tag that includes additional text. In order to provide this information to a user, while managing the white space within map display area 202, information typically provided within a tag is provided within dynamic BRIEFING STRIP® information area 204 of procedure display 200 of FIG. 4.

In an exemplary embodiment, dynamic BRIEFING STRIP® information area 204 is positioned on procedure display 200, adjacent to map display area 202, preferably above map display area 202. However, alternate configurations are possible, including but not limited to, dynamic BRIEFING STRIP® information area 204 being positioned below map display area 202. Dynamic BRIEFING STRIP® information area 204 includes a plurality of rows, each containing information regarding a user-selected procedure. This information is arranged to provide Now/Next procedure information as described below. Dynamic BRIEFING STRIP® information area 204 includes a procedure identification description 302. Dynamic BRIEFING STRIP® information area 204 may also include a communication information area (not shown in FIG. 7), providing a user with information on communication requirements of the selected procedure.

Dynamic BRIEFING STRIP® information area 204 further includes a description of a current leg 306, referred to herein as the Now field. The Now procedure-leg row may also be labeled as the "To" procedure-leg row, as shown in FIG. 7. This label reflects the emerging dominance of "to-to" navigation. The Now leg may also carry an associated "From" indication when appropriate. Dynamic BRIEFING STRIP® information area 204 also provides a description of a subsequent leg 308, referred to herein as the Next field. Now field 306 and Next field 308 include information, as described above, which on paper charts is typically included within a tag that is attached to a symbol with a line or an arrow. Procedure display system 104 separates the symbols from more in-depth information regarding what is symbolized in order to facilitate clearly displaying an entire procedure on a single electronic display screen, such as display screen 102. The information contained in Now field 306 and Next field 308 may include, but is not limited to, a fix name, a leg distance, heading information, altitude information, and procedure notes such as missed approach instructions.

In an exemplary embodiment, Next field 308 changes position, by moving to the position of Now field 306, upon completion of the leg described in Now field 306. In an exemplary embodiment, this change occurs automatically as flight procedure display system 104 receives an indication of completion of the leg described in Now field 306. Flight procedure display system 104 may receive this automatic indication from, for example, an altimeter, an air speed indicator, and a global positioning system (GPS). In another exemplary embodiment, the contents of Now field 306 and Next field 308 are selected by a user. For briefing and situational awareness purposes, a user is able to manually cycle forward or backwards through the legs of a procedure by providing flight procedure display system 104 with an input instructing a direction for Now field 306 and Next field 308 to move. Manually cycling forward or backwards through the legs allows a user to view previous, current, or subsequent legs of a procedure. Such a user input may be provided by an input device including, but not limited to, a line select key, a mouse, a pointing device, a touch screen, a rotary dial, and a switch. In this type of preview or review mode the user will be able to select that the Now field display the current leg that is being flown.

In an example embodiment, Now field 306 is positioned above Next field 308. A typical user is conditioned to read from the left to the right, and from the top to the bottom of a piece of paper or a display. By positioning Now field 306 above Next field 308, a user following normal behavioral patterns will receive the information contained in dynamic BRIEFING STRIP® information area 204 in a proper order. Unlike information provided within tags on paper charts, the Now field/Next field order entails receiving a description of the legs in the order to be completed for successful completion of a procedure. Also, listing each leg of a procedure separately and in a purposeful order eases a user's comprehension of the information as compared to information displayed in larger groupings. In another exemplary embodiment, dynamic BRIEFING STRIP® information area 204 includes a plurality of Next fields 308. Each of the plurality of Next fields 308 positioned below Now field 306, and in an order corresponding to the order Next fields 308 are to be completed.

Figure 8:
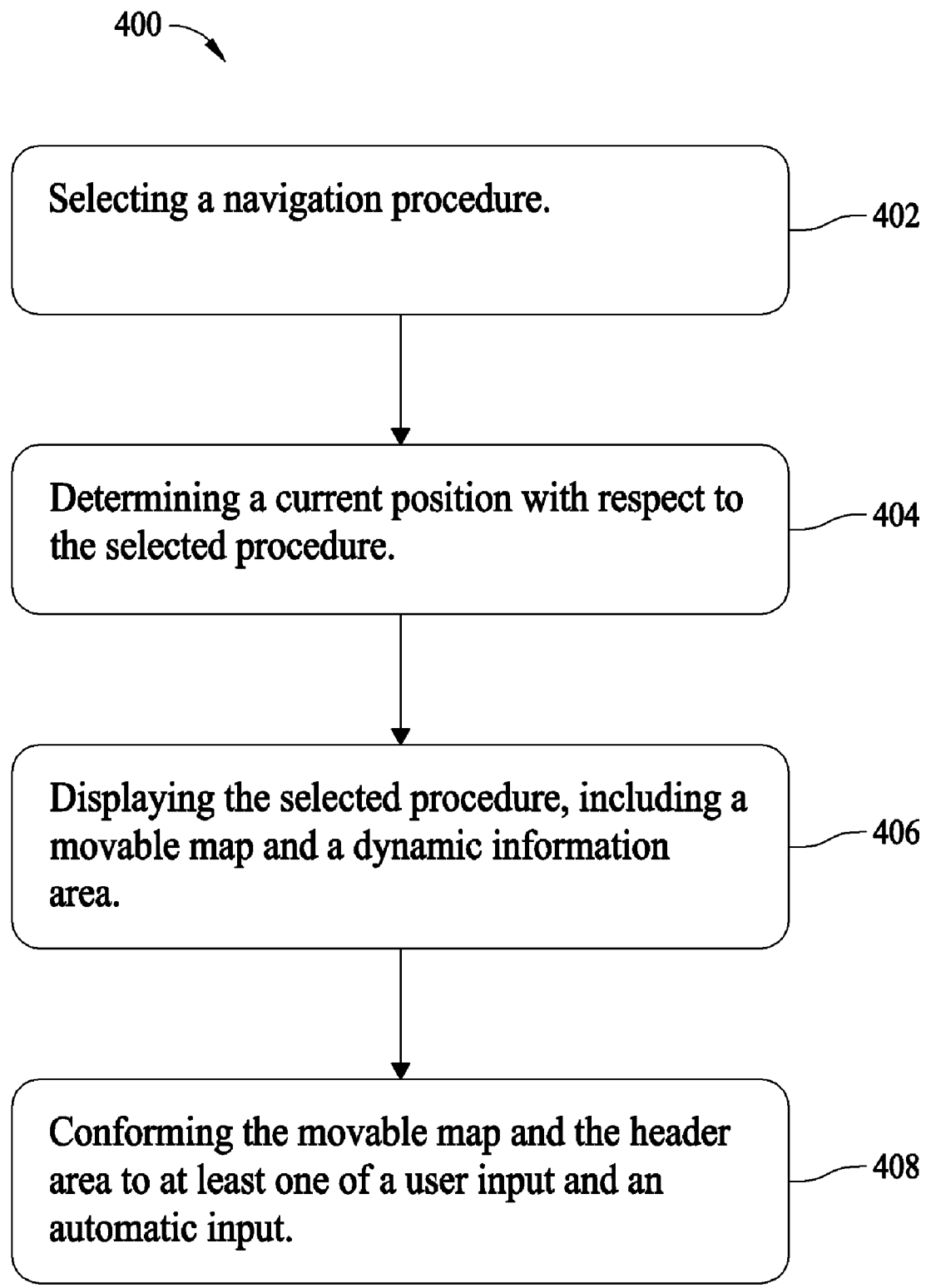
FIG. 8 is a flow chart of an exemplary method of dynamically displaying navigation procedures on an electronic display.

FIG. 8 is a flow chart of an exemplary method 400 of dynamically displaying navigation procedures on an electronic display. Method 400 includes selecting 402 a procedure and determining 404 a current position of, in an exemplary embodiment, an aircraft. Method 400 also includes displaying 406 the selected procedure. Displaying 406 the selected procedure includes displaying a movable map including situational awareness symbols. In an exemplary embodiment, the situational awareness symbols represent at least one of the legs of a procedure and obstacles of significance. Displaying 406 the selected flight procedure also includes displaying a dynamic BRIEFING STRIP® information area including at least a current step of the selected procedure and a subsequent step of the selected procedure. Method 400 also includes conforming 408 the movable map and the dynamic BRIEFING STRIP® information area in response to at least one of a user input indicating a desired procedure, a user input indicating completion of a procedure instruction, a user input advancing procedural information to a successive flight instruction, a user input reverting the procedural information to a previous flight procedure instruction, and an automatic input provided to flight procedure display system 104 upon completion of a procedure instruction.

The above-described methods and systems for displaying dynamically depicted flight procedures allow a user who is used to paper charts to make the transition to an electronic map with minimal training. The above-described methods and systems also utilize capabilities of an electronic system, as compared to a paper chart, specifically, that a user electronically selects the procedure he/she desires, rather than using a paper chart that includes multiple procedures. The methods facilitate navigation and situation awareness in a cost-effective and reliable manner.

The dynamically depicted procedures may contain any elements currently found in traditional paper chart procedures and also additional elements. For illustrative purposes, an aircraft procedure could include, but not be limited to elements such as airports, navigation aids, airways, topographical information, "minimums," radio frequencies, missed approach procedures, distances, obstacles, timing information and other elements typical of these types of procedure descriptions.

Additional elements that are facilitated include distance rings, otherwise referred to as range rings, which depict the dynamic distance from the current position as an aid for situational awareness. The range rings are determined and change in response to, for example, but not limited to, a current position of the aircraft, relative wind direction, and relative wind speed. The range rings may also correspond to positions located a distance from the current position of an aircraft that the aircraft may reach within a selected time period.

The information displayed by the display system on the procedure display may be tailored based on additional conditions. These conditions may include, but are not limited to, a specific type of aircraft or vehicle, a category of aircrafts or vehicles, installed equipment, performance characteristics, geographical elements, meteorological conditions, flight plans, flight plan restrictions, and chronological events. These conditions may be provided to the display system automatically or by a user.

The term "user", as used herein, includes a human operator, as well as systems and applications. Therefore, the term user is not limited to being a human, and in many instances references a system or application that includes software operating on a processor.

The terms Now and Next are the preferred nomenclature for describing the procedure or leg that is currently being flown (Now) and the subsequent waypoint or leg to be flown as part of the procedure (Next). In practice many displays or implementations of these types of system may instead use the term "From" in place of "Now" and "To" in place of "Next". The substitution of these words is merely for convenience or product familiarity and should not be interpreted as implying different functionality than the "Now/Next" concepts.

Also, as used herein, the term "processor" refers to a digital processor, an analog processor, as well as any analog and digital circuit as well as software, including combinations thereof, capable of performing the described functions. For example, the processor could be a microprocessor, a computer, an analog circuit, a combination analog and digital circuit, a server (e.g., an e-mail server, a general purpose server), an integrated circuit, software, and any combination of the foregoing. Also, the described processing need not be performed by a single processor, but could be performed across more than processor.

While the invention has been described in terms of various specific embodiments, those skilled in the art will recognize that the invention can be practiced with modification within the spirit and scope of the claims and is not limited to the specific embodiments described.

What is claimed is:

1. A display for airport approach and departure flight procedures, said display comprising:
   a dynamic information area, said dynamic information area including at least one instruction of a user selected flight procedure, the at least one instruction based on a current position of an aircraft associated with said display, a portion of said dynamic information area including airport dependent and aircraft dependent flight procedure information; and
   a moving map area, said moving map area including a plan view of the user selected flight procedure and an indication of current position with respect to the user selected flight procedure, said moving map area configured to display only symbols related to the user selected procedure, rather than the symbols for all defined approach procedures or the symbols for all defined departure procedures relevant to the current status and position of the aircraft, said dynamic information area allowing for decluttering of said moving map area.

2. The display according to claim 1 wherein the flight procedure display is configured to be updated based on at least one input.

3. The display according to claim 2 wherein the at least one user selected flight procedure comprises a plurality of flight procedure instructions, and the at least one input comprises at least one of:
 a user input indicating completion of one instruction of the plurality of flight procedure instructions within a user selected flight procedure;
 a user input to advance said dynamic information area of said display to at least one successive instruction of the plurality of flight procedure instructions;
 a user input to revert said dynamic information area of said display to at least one previous instruction of the plurality of flight procedure instructions; and
 an automatic input provided to said display upon completion of one instruction of the plurality of flight procedure instructions.

4. The display according to claim 3 wherein the automatic input comprises an input from at least one of an altimeter, an air speed indicator, and a global positioning system.

5. The display according to claim 1 wherein said moving map area is configured to display a rotating map such that the map remains in a predetermined orientation regardless of a direction of travel.

6. The display according to claim 1 wherein said display is configured to be tailored according to at least one condition.

7. The display according to claim 6 wherein the at least one condition comprises at least one of a specific type of aircraft or vehicle, a category of aircrafts or vehicles, installed equipment, a performance characteristic, and a flight plan restriction.

8. The display according to claim 6 wherein the at least one condition is provided to said display by at least one of an automatic input and a user input.

9. The display according to claim 1 wherein the at least one flight procedure instruction comprises a current flight procedure instruction based on at least one of a user input and an automatic input from a sensing device.

10. The display according to claim 1 wherein the at least one instruction of a user selected flight procedure further comprises at least one of a fix name, a leg distance, heading information, altitude information, and procedure notes.

11. The display according to claim 1 wherein the current position indication is comprised of an abstract symbol.

12. The display according to claim 1 wherein said moving map area comprises a situational awareness symbol corresponding to the user selected flight procedure, the situational awareness symbol having an associated alphanumeric description.

13. The display according to claim 1 wherein said moving map area is further configured to display a plurality of situational awareness symbols that are symmetrically shaped such that as the map moves, conflicting symbols continue to conflict with the same number of other symbols.

14. The display according to claim 1 wherein said moving map area is further configured to display a plurality of situational awareness symbols, and the current aircraft position indication and the situation awareness symbols are ranked in order of a predetermined significance, wherein a more significant symbol is positioned in a foreground of the flight procedure display as compared to a less significant symbol.

15. The display according to claim 1 wherein said dynamic information area comprises:
 a flight procedure identification description;
 a plurality of rows, each row associated with a leg of the user selected flight procedure and containing an instruction of the user selected flight procedure; and
 a procedure notes area including at least one of airport dependent information and aircraft dependent information.

16. A flight procedure display system comprising:
 an electronic display screen configured to display a moving map and a dynamic information area, the dynamic information area including at least one flight procedure instruction of a user selected flight procedure and at least one of an airport and an aircraft dependent approach or departure procedure, the moving map including a plan view of the user selected flight procedure and an indication of current position with respect to the user selected flight procedure, the dynamic information area and the map area configured to display only information related to the user selected flight procedure, rather than the symbols for all defined approach procedures or the symbols for all defined departure procedures relevant to the current status and position of the aircraft; and
 at least one input device in communication with the electronic display screen, the at least one input device configured to facilitate user selection of a flight procedure from a plurality of stored flight procedures and facilitate user selection of specific flight procedure instructions of the selected flight procedure for display on the electronic display screen.

17. The flight procedure display system according to claim 16 further comprising at least one of a computing device and a computing system in communication with the electronic display screen and the at least one input device.

18. The flight procedure display system according to claim 16 wherein the moving map comprises a map configured to rotate such that the map remains in a predetermined orientation regardless of a direction of travel.

19. The flight procedure display system according to claim 16 wherein the at least one flight procedure instruction within the dynamic information area comprises at least one of a current flight procedure instruction and a successive flight procedure instruction.

20. The flight procedure display system according to claim 16 wherein the flight procedure instruction further comprises at least one of a fix name, a leg distance, heading information, altitude information, and procedure notes.

21. The flight procedure display system according to claim 16 wherein the moving map and the dynamic information area are positioned within separate portions of the electronic display screen.

22. The flight procedure display system according to claim 16 wherein the at least one input device comprises at least one of a line select key, a mouse, a pointing device, a touch screen, and a rotary dial.

23. The flight procedure display system according to claim 16 wherein the at least one input device is configured to provide at least one of a user input indicating a desired flight procedure, a user input indicating completion of a flight procedure instruction, a user input advancing the flight procedure instruction to a successive flight procedure instruction, a user input reverting the flight procedure instruction to a previous flight procedure instruction, an automatic input indicating completion of a flight procedure instruction, and an input indicating a current position.

24. A method of displaying navigation information on an electronic display, the method comprising:

selecting, from a plurality of electronically stored flight procedures relating to at least one of an airport departure and a runway approach, a flight procedure that includes a plurality of flight procedure instructions arranged in an order to be completed and made up of data elements grouped as procedures and accessed as separate entities in a data store; and displaying a movable map having a plan view of the selected flight procedure and a dynamic information area including at least one of a current flight procedure instruction and a subsequent flight procedure instruction of the selected flight procedure, the dynamic information area and the moving map configured to display only information related to the selected flight procedure, rather than the symbols for all defined approach procedures or the symbols for all defined departure procedures relevant to the current status and position of an aircraft associated with the electronic display.

25. The method according to claim 24 further comprising conforming the movable map and the dynamic information area to at least one of a user input and an automatic input.

26. The method according to claim 25 wherein conforming the movable map and the dynamic information area to at least one of a user input and an automatic input comprises changing the movable map and the dynamic information area in response to at least one of a user input indicating a desired procedure, a user input indicating completion of a procedure instruction, a user input advancing the procedure instruction to a successive procedure instruction, a user input reverting the procedure instruction to a previous procedure instruction, an automatic input indicating completion of a procedure instruction, and an input comprising a current position indication.

27. The method according to claim 24 wherein displaying a movable map further comprises displaying at least one symbol, the at least one symbol comprising at least one of a current position indication and situational awareness identifiers.

28. The method according to claim 27 wherein displaying at least one symbol further comprises displaying situational awareness identifiers that correspond to the at least one procedure instruction of the dynamic information area.

29. The method according to claim 27 wherein displaying at least one symbol further comprises displaying situational awareness identifiers, the situational awareness identifiers comprising elevation indicators, restricted airspace indicators, and other navigational symbols.

* * * * *